(12) United States Patent
Shuster

(10) Patent No.: US 9,483,772 B2
(45) Date of Patent: *Nov. 1, 2016

(54) METHOD AND APPARATUS FOR PROVIDING CONTENT TO USERS

(71) Applicant: INTELLECTUAL VENTURES I LLC, Wilmington, DE (US)

(72) Inventor: Brian Shuster, Stateline, NV (US)

(73) Assignee: Intellectual Ventures I LLC, Wilmington, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/652,192

(22) Filed: Oct. 15, 2012

(65) Prior Publication Data

US 2013/0036163 A1 Feb. 7, 2013

Related U.S. Application Data

(63) Continuation of application No. 09/419,698, filed on Oct. 14, 1999, now Pat. No. 8,291,340.

(51) Int. Cl.
*G06F 17/00* (2006.01)
*G06Q 30/02* (2012.01)
(52) U.S. Cl.
CPC .................................. *G06Q 30/02* (2013.01)
(58) Field of Classification Search
CPC ........................... G06F 9/4443; G06F 3/0481
USPC ......... 715/204, 234, 745, 749; 709/224, 219
See application file for complete search history.

(56) References Cited

U.S. PATENT DOCUMENTS

| 5,737,619 A | 4/1998 | Judson |
| 5,841,420 A | 11/1998 | Kaply et al. |
| 5,913,040 A | 6/1999 | Rakavy et al. |
| 5,937,392 A | 8/1999 | Alberts |
| 6,011,537 A | 1/2000 | Slotznick |
| 6,018,619 A | 1/2000 | Allard et al. |

(Continued)

FOREIGN PATENT DOCUMENTS

| WO | 98/25198 | 6/1998 |
| WO | 9959097 | 11/1999 |

OTHER PUBLICATIONS

Marable, et al., "Designing Smart Pop-up Windows," Web Techniques, Jul. 1998, Miller Freeman, USA, vol. 3, No. 7, XP008019169, pp. 65-68.

(Continued)

*Primary Examiner* — Stephen Hong
*Assistant Examiner* — Matthew Ludwig
(74) *Attorney, Agent, or Firm* — Meyertons, Hood, Kivlin, Kowert & Goetzel, P.C.

(57) ABSTRACT

Embodiments of the instant invention are directed to a method and apparatus for presenting unsolicited data to users without interrupting the user's activities, wherein the presentation of the unsolicited data is monitored and is available for review by the user at the user's convenience. Embodiments of the invention comprise a content and display manager, wherein the content and display manager include a display monitor, a content delivery system and a content controller. The display monitor selects the display of content to the users, in part, by reviewing a marker which defines the last time that content was displayed to the user and the type of content displayed. The content delivery system transmits a content window to a user computer via the controller.

20 Claims, 2 Drawing Sheets

(56) References Cited

U.S. PATENT DOCUMENTS

| | | | |
|---|---|---|---|
| 6,128,663 | A | 10/2000 | Thomas |
| 6,201,538 | B1 | 3/2001 | Wugofski |
| 6,285,985 | B1 | 9/2001 | Horstmann |
| 6,314,451 | B1 | 11/2001 | Landsman et al. |
| 6,317,782 | B1 * | 11/2001 | Himmel ............... G06Q 30/02 705/14.53 |
| 6,317,789 | B1 * | 11/2001 | Rakavy ............... G06Q 30/02 709/203 |
| 6,353,849 | B1 | 3/2002 | Linsk |
| 6,393,407 | B1 * | 5/2002 | Middleton, III ....... G06Q 30/02 705/14.73 |
| 6,421,733 | B1 * | 7/2002 | Tso et al. ...................... 709/246 |
| 6,473,102 | B1 | 10/2002 | Rodden et al. |
| 6,642,944 | B2 | 11/2003 | Conrad et al. |
| 6,687,737 | B2 | 2/2004 | Landsman et al. |
| 6,721,795 | B1 | 4/2004 | Eldreth |
| 6,785,659 | B1 * | 8/2004 | Landsman et al. ......... 705/14.73 |

OTHER PUBLICATIONS

Netscape Communications Corporation, Client-side object javascript Reference, May 28, 1999, URL:l/docs.sun.com/source/816-6408-10/window.htm>, 69 pages. [Retrieved Jul. 27, 2001].
Langheinrich, et al., "Unintrusive Customization Techniques for Web Advertising," http://www8.org/w8-papers/2b-customizing/unintrusive/unintrusive.html, 18 pages. [Apr. 11, 2011].
User Interface Pop-up Duration by Contained Content, IBM Technical Disclosure Bulletin, vol. 37, No. 4A, Apr. 1994, XP000446805, p. 623.
European Search Report in Application No. 07106617.9 mailed Jul. 30, 2007, 2 pages.
Office Action in Canadian Patent Application No. 2385165 issued Mar. 11, 2010, 4 pages.
Paul Festa, "GeoCitizens bristle at pop-up ads," CNETNews.com, Dec. 18,1997, https://news.com/2100-1023-206507.html, 3 pages. [Retrieved Apr. 27, 2007].
Brent Lee Metcalfe, "Advanced JavaScript windowing—part one: Self-closing popups," Jul. 23, 1998, http://www.developer.com/lang/other/print.php/603511, 5 pages. [Retrieved Jun. 14, 2005].
Greg Perry, "Sam's Teach Yourself Visual Basic 5 in 24 Hours," Sams Publishing 1st Edition, 1997, pp. 300-307.
Search result page from: http://groups.google.com/groups?q=javascript+blur&h1=en&lr=&scoring=d&as.-sub.—drrb=b&as.sub.—mind=12&as.sub.—minm=5&as.sub.—miny=1981&as.sub.—maxd=31&as.sub.—maxm=12 &as.sub.—maxy=1997&selm=66pt24%24rab%40miwok.nbn.com&rnum=10, From search on Jun. 21, 2002, showing archived page dated Dec. 11, 1997 including program code in JavaScript.
International Search Report in Application No. PCT/US00/28500 mailed Jul. 3, 2003, 3 pages.
Konrad Roeder, :All About the Internet, Part 21-The Dark Side of Cookies, 1997, http://www.geocities.com/kgrr/internet/part21.html, 2 pages. [Retrieved Jan. 15, 2003].
Component Watch, 'FilterGate', last modified Sep. 12, 1999, 5 pages.

\* cited by examiner

METHOD AND APPARATUS FOR PROVIDING CONTENT TO USERS

RELATED APPLICATIONS

The present application is a continuation of U.S. application Ser. No. 09/419,698, filed Oct. 14, 1999 (now U.S. Pat. No. 8,291,340), the disclosure of which is incorporated by reference herein in its entirety.

The present application is also related to U.S. application Ser. No. 09/419,701 (now U.S. Pat. No. 6,763,379) entitled "System, Apparatus and Method for Presenting and Displaying Content On a Wide Area Network," which is incorporated herein by reference.

FIELD OF THE INVENTION

This invention is directed to a method and apparatus for providing content to users on a wide area network with minimal disruption in the user's activities. More specifically, embodiments of this invention direct content to users by displaying pop-up windows that momentarily appear in front of the user's primary browser window, but are moved to a window behind the user's primary window, wherein the data for pop-up window is downloaded.

BACKGROUND OF THE INVENTION

Wide area networks, such as the World Wide Web ("WWW") or the Internet, have become increasingly popular modalities for the advertisement of products. Indeed, much like broadcast medium, for example, radio and television, advertisers will sponsor content in exchange for the right to display their advertisements. Indeed, advertisers sponsor most of the content on the WWW. The sponsorship provided by the advertiser supports the host providers and, in some instances, facilitates free hosting for individual users.

To be effective as a means of generating and promoting products or services, advertisers desire high visibility for their advertisements, that is, advertisers desire to display their advertisements as frequently as possible, wherein the advertisements are not easily avoided or evaded by the consumer. At variance with the advertisers' desire, users do not want to be disturbed in their activities. Currently, unlike the broadcast medium wherein the advertisements are placed in between the content of the main programming, advertisements on the WWW can be displayed at any time, and thus, typically interrupt the content that the user is viewing.

At least one current type of advertising on the WWW is a banner advertisement. Banner advertisements are typically placed at the top or bottom of the page and require the user to affirmatively click on the advertisement in order to visit a web site that contains more detailed information regarding the goods or services indicated in the banner advertisement. Most users now recognize banner advertisements and do not click on these advertisements.

Another form of advertising on the WWW is in the form of a pop-up advertisement. A pop-up advertisement is a window that opens in a new browser window when a user visits a web site. The pop-up window opens in front of the user's primary browser window, thereby forcing the user to take affirmative action, such as, for example, close the advertising window, or forcing the user to view the advertisement and click to the advertiser's site. In many instances, the advertisement fails to be completely displayed as the user closes the pop-up window prior to the completion of the advertisement loading.

In addition to the initial inconvenience and interruption that the pop-up windows cause to the user, the pop-up window advertisements create further problems. For instance, despite the user closing the pop-up window, these windows do not always remain closed. Indeed, at times, if the user visits another page on the site with the pop-up code, the advertisement will reappear, thereby causing the user to once again have to close the window. Further, if the user leaves the page containing the pop-up window, the pop-up window will reopen upon the user's return to the page. Similarly, if the page is reloaded for any reason, the pop-up advertisement will open again. This inability to permanently close these pop-up windows creates a further annoyance for the user as well as exacerbating the for the advertiser and possibly for the web site. As this annoyance can cause a user to avoid web sites, the web site may experience a decrease in traffic, as well as, a decrease in the willingness of other web sites to direct traffic to the sites that utilize these types of advertisements.

A need in the industry exists for a method of presenting unsolicited data to users without interrupting the user's activities and in a manner that allows the unsolicited data to be reviewed by the user at the user's convenience. Further, a need exists for a method of presenting unsolicited data that is monitored such that the unsolicited data is not automatically and continuously reintroduced to the user, but rather, is presented to the user at a predefined rate.

SUMMARY OF THE DISCLOSURE

Embodiments of the instant invention are directed to a method and apparatus for presenting unsolicited data to users without interrupting the user's activities, wherein the presentation of the unsolicited data is monitored and is available for review by the user at the user's convenience. Other methods and apparatus for accomplishing similar objectives are disclosed in the co-pending application Ser. No. 09/419,701, filed by the inventor hereof on Oct. 14, 1999, which is incorporated herein by reference.

Embodiments of the invention comprise a content and display manager, wherein the content and display manager include a display monitor, a content delivery system and a content controller. The display monitor selects the display of content to the users, in part, by reviewing a marker which defines the last time that content was displayed to the user and the type of content displayed. Based upon the information in the marker, the display monitor will decide not to display any content at that time, or it will determine the content to be displayed and submit a request to the content delivery system to display the chosen content.

The content delivery system transmits a content window to the user's browser. The controller controls the downloading of the content from the content delivery system. The controller initially displays the content window in front of a first browser window position and then displays the content window behind the first browser window.

Once the content is downloaded, the display monitor transmits a new marker to the browser, or updates the existing marker. The marker indicates the time of the display and identifies the content displayed.

A feature of embodiments of the instant invention is that the presentation of unsolicited content can be set at a predefined frequency rate. An advantage of this feature is that the frequency with which unsolicited data is displayed is regulated such that the unsolicited content is not repeatedly introduced to the user.

Another feature of embodiments of the instant invention is that the controller is configured to momentarily display a content window in front of the user's foremost browser window and move the content window to a frame behind the browser window to download the content. An advantage of this feature is that the user has become aware that a new window is being downloaded, but the new window is not disruptive of what the user is currently viewing. A further advantage to this feature is that the content designated to be downloaded into the window is hidden from the user during the downloading and thus, has sufficient time to download the information without interruption from the user. Still a further advantage to this feature is that since the user's activities were not interrupted, the user might be more willing to view the unsolicited content when he has completed his current activities.

Another feature of embodiments of the instant invention is that the unsolicited content is presented in a window that can be any size necessary to display the full content of the advertisement up to the size of a full screen. An advantage to this feature is that the user is not required to affirmatively respond to review the unsolicited content.

A further feature of embodiments of the invention is the display analyzer which monitors the frequency of display of content and the specific content presented. An advantage of this feature is that the user is not repeatedly presented with unsolicited content or with the same content.

The above and other features and advantages of embodiments of this invention will be apparent from the following more detailed description when taken in conjunction with the accompanying drawings of illustrative embodiments.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF PREFERRED EMBODIMENTS

Embodiments of the instant invention are directed to a method and apparatus for displaying content to users on a wide area network. Embodiments of the instant invention employ a network of computers and programs for retrieving and displaying content to users on a wide area network, such as, the WWW or the Internet.

Figure 1:
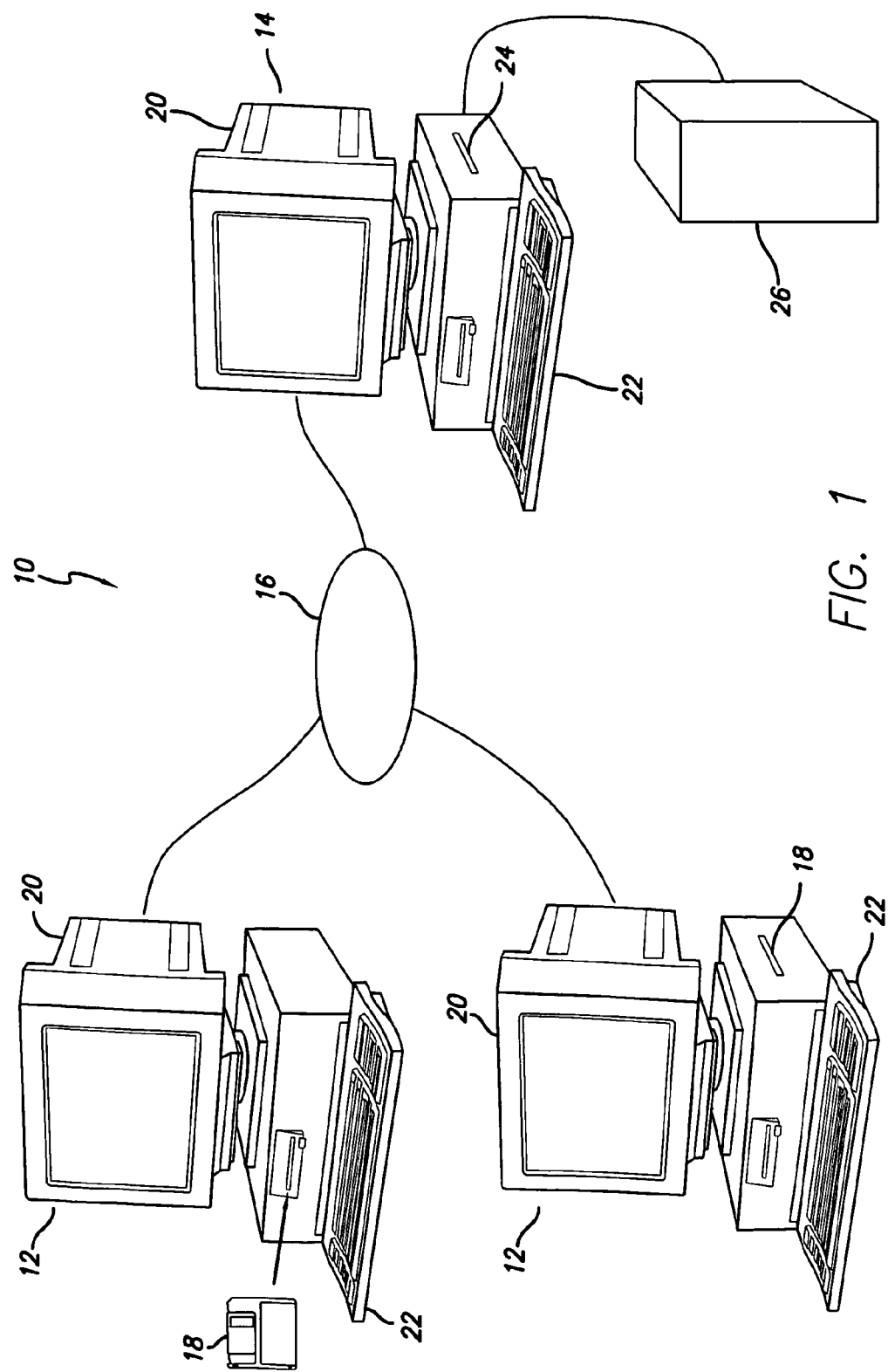
FIG. 1 is a network system environment in accordance with a preferred embodiment of the instant invention.

Hardware Environment:

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least two client or user computers 12 and at least one provider, or content, computer 14 coupled for communication therebetween by the remainder of the network, generally represented at 16. In the illustrated embodiment, two client or user computers 12 and one content provider computer 14 is shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer 12 comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

The user computer 12 is controlled by suitable software, including network communication and browser software to allow a user to request, receive and display information (or content) from or through a content provider computer 14 on the network system 10. In preferred embodiments, the user computer 12 employs a program, such as a browser, for displaying content received from a provider computer 14.

The content provider computer 14 may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media 24 (for example, but not limited to, floppy disks, hard disks, random access memory RAM, CD-ROM), to provide content for communication to a user computer 12. The provider computer may comprise, for example, but is not limited to, a personal computer, a mainframe computer, network computer, portable computer, personal data assistant (such as, a 3Com Palm Pilot), or the like. The provider computer 14 may include one or more internal data storage devices (not shown) for storing content for communication to a user computer 12. Alternatively, or in addition, the provider computer 14 may be coupled to an external data storage device, computer or other means, generally represented at 26, from which the provider computer 14 may obtain content for communication to a user computer 12. In one embodiment, the external device 26 may comprise a further network device coupled in the network 16.

Figure 2:
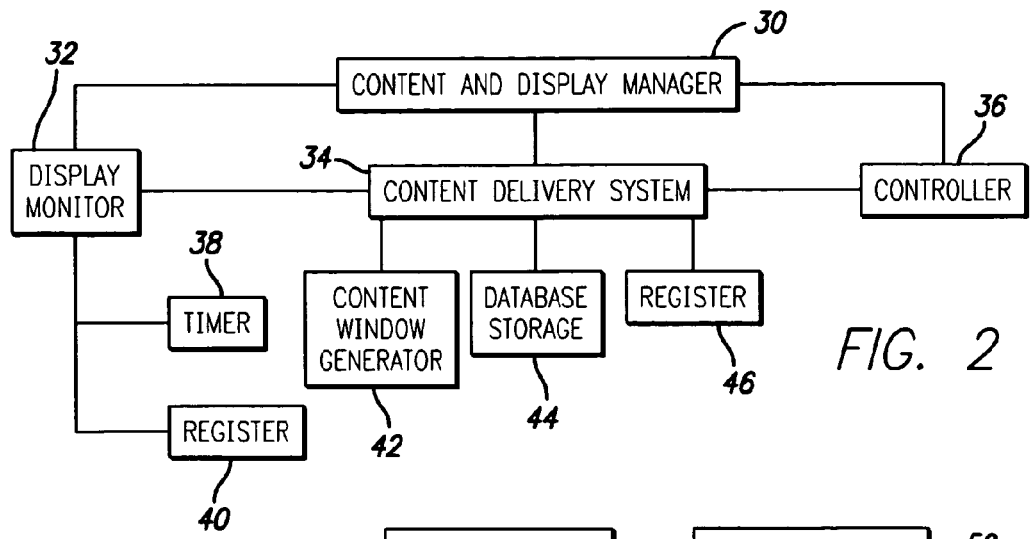
FIG. 2 is a schematic of a content and display manager in accordance with a preferred embodiment of the instant invention.

General Description of Preferred Embodiments:

Embodiments of instant invention are directed to a content and display manager 30. With reference to FIG. 2, the content and display manager 30 comprises a display monitor 32, a content delivery system 34 and a content controller 36.

The display monitor 32 selects the display of content to the users. In one embodiment, the display monitor 32 comprises a timer 38 and a register 40. The timer 38 is set at a predefined period, wherein the timer compares the predefined period to the lapsed time between the current request for content from the user, including, but not limited to, a request for a web site, a web page, any data identified at a specific IP address, or any location of content anywhere, including on a network, to the provider computer 14 and when the most recent content was displayed to the user.

The register 40 lists the available content for display. In preferred embodiments, the register 40 is a text file or a database, although any suitable means for cataloguing or identifying the list of available content is suitable. In another preferred embodiment, specific content is identified for a particular web site or web page.

When a user requests a web site or web page, from the provider computer 14, the display monitor 32 examines the client browser to determine whether it includes a marker (not shown), such as, for example, a cookie. The marker includes a time stamp and the identification of the previously displayed content. If the client browser includes a marker, the display monitor 32 reviews the time stamp on marker to determine whether to display new content. If the time duration between the previous display of content and the current request for a web site or a web page from the provider computer is greater than the predefined period, the display monitor 32 reviews the identification of the previously displayed content. Based upon the previously displayed content, if any, and based upon any other parameters that are normally used to display advertisements, the display monitor 32 chooses a content set to download, and instructs the content delivery system 34 to commence the delivery of the content. In other preferred embodiments, the marker includes other data, including, but not limited to, user information, the list of a predefined number of previously visited sites, browser information, previously displayed content, user IP address, and identification of the user operating system.

The content delivery system 34 includes a content window generator 42, a database storage 44, and a register 46. The window generator 42 is any means capable of generating a content window for downloading, including, a software program or HTML instructions. The database storage 44 is memory that stores the content to be downloaded. The database storage 44 can be located in a separate memory storage means and accessed by the content delivery system, or it can reside resident on the provider computer 14.

The database storage 44 is linked to the register 46. The register 46 is a database that lists the available content and the content's location. The information regarding the identification of the content in the database in register 46 is identical to the identification of the content in register 40.

The controller is a CPU having a set of instructions, or other computer program, whereby the instructions may control the size of and placement of the window generated by the content delivery system 34 and the downloading of the content into the window. Specifically, the controller initially display the content window in front of the primary browser window and then move the content window behind the primary browser window position. In other embodiments, the controller initially displays the content window behind the primary browser window. In some instances, a notification is displayed or flashed to the user that new content has been downloaded. The controller directs the downloading of the content immediately upon the display of the content window. However, the content may not be completely downloaded until the content window resides behind the primary browser window.

Figure 3:
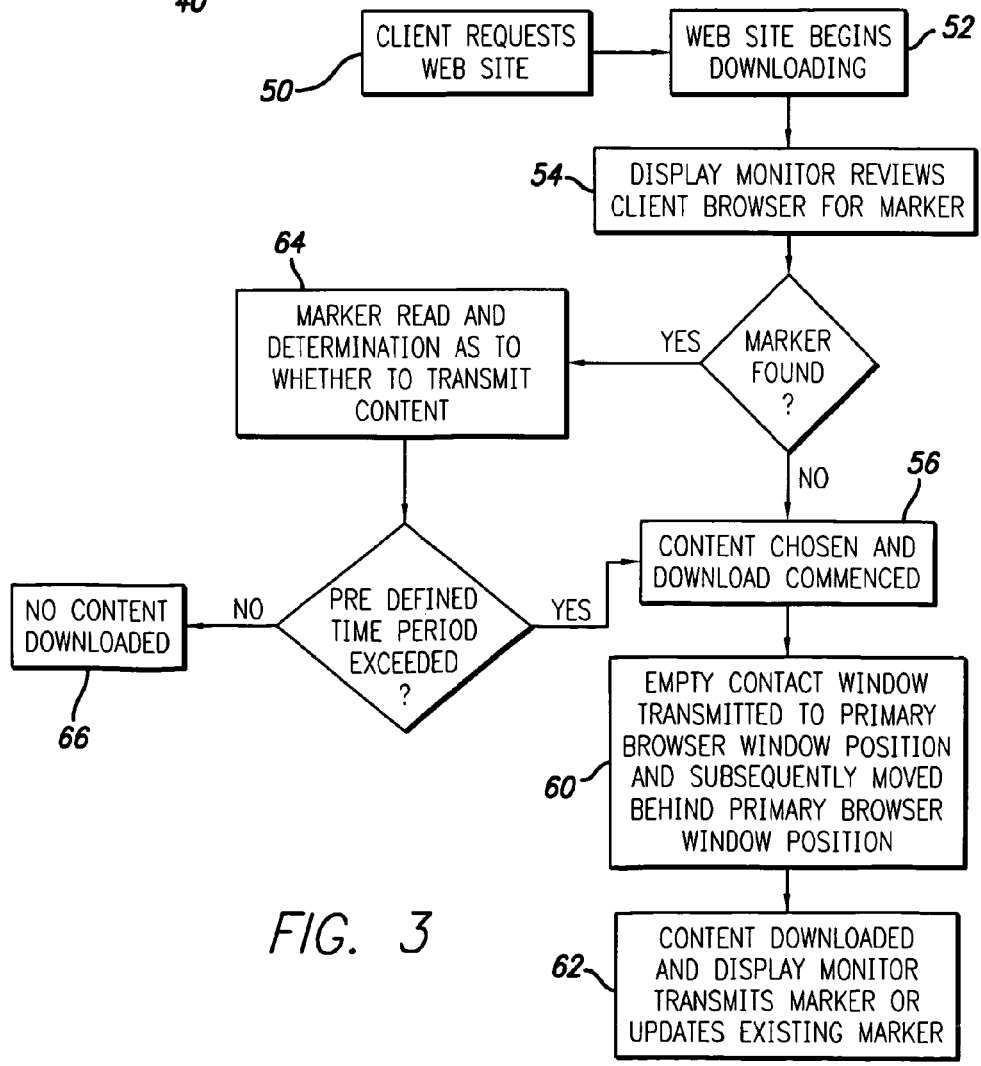
FIG. 3 is a block diagram of selecting and displaying content to users in accordance with a preferred embodiment of the instant invention.

With reference to FIG. 3, in operation, the client browser requests a web site 50 from the provider computer 14. Upon the downloading of the requested web site 52, the content and display manager 30 is initiated and the display monitor 32 checks the client browser to determine whether a marker resides on the client browser 54. If no marker resides on the client browser, the display monitor 32 chooses a content set to download, and instructs the content delivery system 34 to commence the delivery of the content 56.

The content delivery system transmits a content window 60 to the client browser and commences downloading the selected content to the provider computer 14. The content window is momentarily displayed in a newly created browser window, or pop-up window, that appears in front of the user's current primary browser window and is then moved behind the user's primary browser window. The content completes downloading and the content window remains positioned behind the user's primary browser window until the user elects to review the window containing the newly downloaded content. Once the content is downloaded, the display monitor transmits a marker to the client computer 62, wherein the marker indicates the time the user received the content and the identification of the content received. In another embodiment, the marker is downloaded at any time, including downloading the marker prior to, or during, content download.

If a marker is identified on the client browser, the display monitor reads the marker to determine the time when the last content was transmitted to the client browser 64. If the time since the last content download was less than the predefined time period, the display monitor does not instruct the content delivery system 34 to download any new content 66. If instead, the time since the last content download was greater than the predefined time period, the display monitor determines the content to download based on a variety of parameters, including, but not limited to, available advertisements for display, prioritization of available advertisements, demographic information of the user, previous responses of the user to previous advertisements, and previous advertisements displayed, and instructs the content delivery system to download the selected content 56, wherein the downloading of content proceeds as described above. In some embodiments, the downloading of content is not time dependent, but is based, in part, on provider defined parameters, including, but not limited to, available advertisements for display, prioritization of available advertisements, demographic information of the user, previous responses of the user to previous advertisements, and previous advertisements displayed.

Although the foregoing described the invention with embodiments having particular forms that have been illustrated and described, this is not intended to limit the invention. For instance, although preferred embodiments have been described with reference to a wide area network, it is to be understood that embodiments of the invention are also applicable on other networks, including, but not limited to, a local network, an intranet and an internet. Indeed, the foregoing is intended to cover all modifications and alternative constructions falling within the spirit and scope of the invention as expressed in the appended claims.

We claim:

1. A method, comprising:
  receiving, by a server computer, a previous request from an application at a user computer, wherein the previous request is for content associated with a first web page;
  based on the previous request, sending, by the server computer, first server selected content to the user computer, wherein the first server selected content includes the content associated with the first web page and a first item of unrequested content;
  the server computer instructing the application at the user computer to store a set of information that corresponds to the first server selected content, wherein the set of information that corresponds to the first server selected content includes one or more attributes corresponding to the first item of unrequested content;
  subsequent to receiving the previous request, receiving, by the server computer, a current request for content from the application at the user computer, wherein the current request is for content associated with a second web page;
  based on the current request, the server computer receiving, from the application at the user computer, the set of information that corresponds to the first server selected content and that was previously stored by the application at the user computer;
  based on the one or more attributes corresponding to the first item of unrequested content included in the set of information, the server computer determining to exclude unrequested content from being included in a response to the current request; and
  the server computer sending to the user computer the response to the current request, wherein the response to the current request does not include the unrequested content.

2. The method of claim 1, wherein the set of information includes a cookie.

3. The method of claim 1, wherein the content associated with the first web page is displayable in a first browser window.

4. The method of claim 1, further comprising:
  the server computer instructing the application at the user computer to display the first item of unrequested content and the content associated with the first web page in a first browser window and a second browser window respectively, wherein displaying of the first browser window at least partially obscures displaying of the second browser window for a predetermined interval of time.

5. The method of claim 1, wherein the set of information further includes at least one attribute indicative of a content preference of a user associated with the first web page.

6. The method of claim 1, further comprising:
  based on the one or more attributes corresponding to the first item of unrequested content, determining, by the server computer, that a threshold time has not been met, wherein the determining includes a calculation that an elapsed time since at least a portion of the first item of unrequested content was sent to the user computer is less than the threshold time; and
  based at least on the determining, the server computer withholding from sending to the user computer the unrequested content until after that the threshold time has elapsed.

7. The method of claim 1, further comprising:
  subsequent to receiving the current request, the server computer receiving a subsequent request for content associated with a third web page; and
  the server computer determining to include at least a second item of unrequested content in a response to the subsequent request.

8. The method of claim 1, further comprising:
  based on the one or more attributes, the server computer determining a time stamp that identifies a time of sending the first item of unrequested content to the user computer; and
  based on information indicating that a difference between the time of sending the first item of unrequested content and a time associated with receiving the current request is below a threshold value, the server computer sending to the user computer the content associated with the second web page without the unrequested content.

9. A non-transitory computer-readable medium having instructions stored thereon that are executable by a computer system to cause the computer system to perform operations comprising:
  receiving a user request from an application at a user computer, wherein the user request is for content associated with a first web page displayable by the application;
  in response to receiving the user request, sending first server selected content to the user computer, wherein the first server selected content includes content associated with the first web page and a first item of unrequested content;
  instructing the application at the user computer to store a set of information that corresponds to the first server selected content, and wherein the set of information that corresponds to the first server selected content includes at least one attribute corresponding to the first item of unrequested content;
  subsequent to the instructing, sending a server request to the user computer, wherein the server request is for the user computer to transmit to the computer system the set of information that corresponds to the first server selected content and that was previously stored by the application;
  in response to receiving a response to the server request, detecting that the response to the server request includes a transmittal of the set of information that was previously stored, wherein the set of information corresponds to the first server selected content; and
  based on the set of information that corresponds to the first server selected content, withholding from sending to the user computer, until after a particular time interval has elapsed, a second item of unrequested content for display by the application at the user computer.

10. The non-transitory computer-readable medium of claim 9, wherein the operations further comprise:
  based on the detecting, determining that the at least one attribute includes a time parameter of the first item of unrequested content, wherein the time parameter is indicative of a time associated with sending the first item of unrequested content to the user computer; and determining a timing for sending the second item of unrequested content based on a comparison between a threshold amount of time and the time indicated by the time parameter.

11. The non-transitory computer-readable medium of claim 10, wherein the operations further comprise: subsequent to the instructing, receiving a second user request for content associated with a second web page; and prior to sending to the user computer the second item of unrequested content, sending the content associated with the second web page to the user computer.

12. The non-transitory computer-readable medium of claim 9, wherein the operations further comprise:

based on a prioritization of available unrequested content, the at least one attribute, selecting the second item of unrequested content.

13. The non-transitory computer-readable medium of claim 9, wherein the operations further comprise: receiving, from the user computer, the response to the server request.

14. The non-transitory computer-readable medium of claim 9, wherein the operations further comprise: receiving the response to the server request, wherein the response includes a parameter indicative of an operational condition of the user computer; and selecting, among unrequested content, the second item of unrequested content such that the second item corresponds to the parameter.

15. An apparatus, comprising:

at least one processor;

one or more computer-readable memories configured to communicate with the at least one processor, the one or more computer-readable memories having instructions stored thereupon that are executable by the at least one processor to cause the apparatus to perform operations including:

receiving a request from an application at a user computer, wherein the request is for particular content associated with a website;

based on the request, sending first content to the user computer, wherein the first content includes the particular content and a first item of unrequested content;

instructing the application at the user computer to store a set of information that corresponds to the first content, wherein the set of information that corresponds to the first content includes one or more attributes corresponding to the first item of unrequested content;

receiving another request for content from the application at the user computer, wherein the other request is for content associated with another website;

subsequent to receiving the other request, receiving, from the user computer, the set of information that corresponds to the first content and that was previously stored by the application;

in response to receiving the set of information that corresponds to the first content, determining whether to exclude, from a response to the other request, unrequested content; and sending to the user computer the response to the other request indicative of a result of the determining.

16. The apparatus of claim 15, wherein the operations further comprise:

based on timing information indicating that a time elapsed from sending the first item of unrequested content to the user computer exceeds a threshold value, sending to the user computer the response to the other request including a second item of unrequested content.

17. The apparatus of claim 15, wherein the operations further comprise:

comparing one of the one or more attributes to a threshold time; and based on a result of the comparing indicating that the attribute is below the threshold time, determining to exclude the unrequested content from being included in the response sent to the user computer.

18. The apparatus of claim 15, wherein the first content includes HTML content.

19. The apparatus of claim 15, wherein the operations further comprise:

based on a result of the determining indicating that at least a second item of unrequested content should be sent to the user computer, selecting the second item to be different from the first item of unrequested content.

20. The apparatus of claim 15, wherein the operations further comprise:

based on a result of the determining indicating that at least a second item of unrequested content should be sent to the user computer, instructing the application at the user computer to display the second item of unrequested content at a position on the user computer different from a display of the content associated with the other website.

* * * * *